(12) United States Patent
Hikita

(10) Patent No.: US 9,153,279 B1
(45) Date of Patent: Oct. 6, 2015

(54) MAGNETIC TAPE CONTROL APPARATUS, RECORDING MEDIUM STORING A CONTROL PROGRAM, AND METHOD

(71) Applicant: FUJITSU LIMITED, Kawasaki-shi, Kanagawa (JP)

(72) Inventor: Minoru Hikita, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/636,318

(22) Filed: Mar. 3, 2015

(30) Foreign Application Priority Data

Mar. 18, 2014 (JP) .................................. 2014-054752

(51) Int. Cl.
 *G11B 15/087* (2006.01)
 *G11B 15/52* (2006.01)
 *G11B 5/008* (2006.01)

(52) U.S. Cl.
 CPC .......... *G11B 15/087* (2013.01); *G11B 5/00821* (2013.01); *G11B 15/52* (2013.01)

(58) Field of Classification Search
 None
 See application file for complete search history.

(56) References Cited

U.S. PATENT DOCUMENTS

| | | | |
|---|---|---|---|
| 6,424,483 B1 * | 7/2002 | Honjo et al. | 360/73.11 |
| 6,700,729 B1 * | 3/2004 | Beck et al. | 360/76 |
| 6,898,045 B2 * | 5/2005 | Beck et al. | 360/76 |
| 7,130,147 B2 * | 10/2006 | Honjo et al. | 360/77.15 |
| 7,393,066 B2 * | 7/2008 | Dugas et al. | 360/75 |
| 7,436,621 B2 * | 10/2008 | Goker et al. | 360/76 |
| 8,982,492 B2 * | 3/2015 | Bui et al. | 360/55 |

FOREIGN PATENT DOCUMENTS

| | | |
|---|---|---|
| JP | 11-242802 | 9/1999 |
| JP | 2002-298470 | 10/2002 |

* cited by examiner

*Primary Examiner* — Wayne Young
*Assistant Examiner* — James L Habermehl
(74) *Attorney, Agent, or Firm* — Fujitsu Patent Center

(57) ABSTRACT

A magnetic tape control apparatus includes a control device that executes a process including: detecting an occurrence of speed fluctuations of a running magnetic tape for each recorded area from which a synchronization error is detected, when the synchronization error of a bit signal of a track is detected with a time lag between any of tracks of the running magnetic tape partitioned in units of recording areas; and setting the recording area as an unavailable area in accordance with a state where the speed fluctuations in the recording area occur.

12 Claims, 12 Drawing Sheets

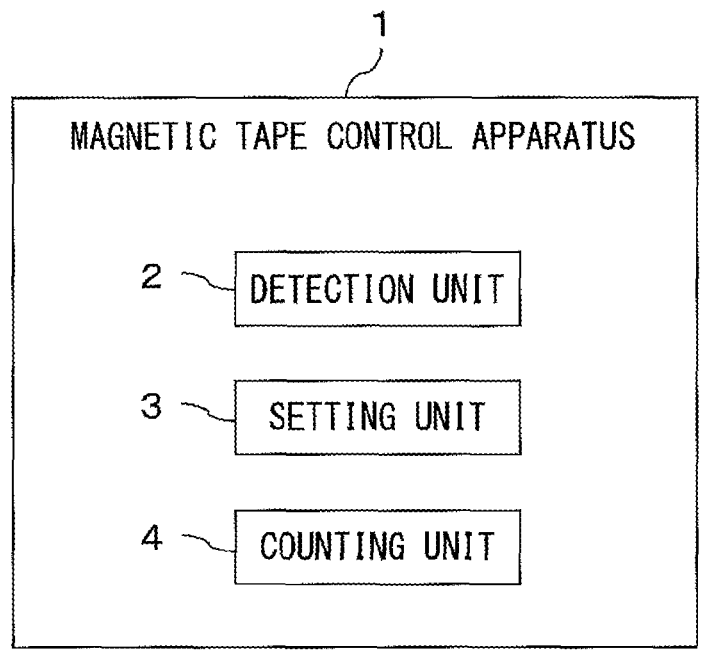
F I G. 1

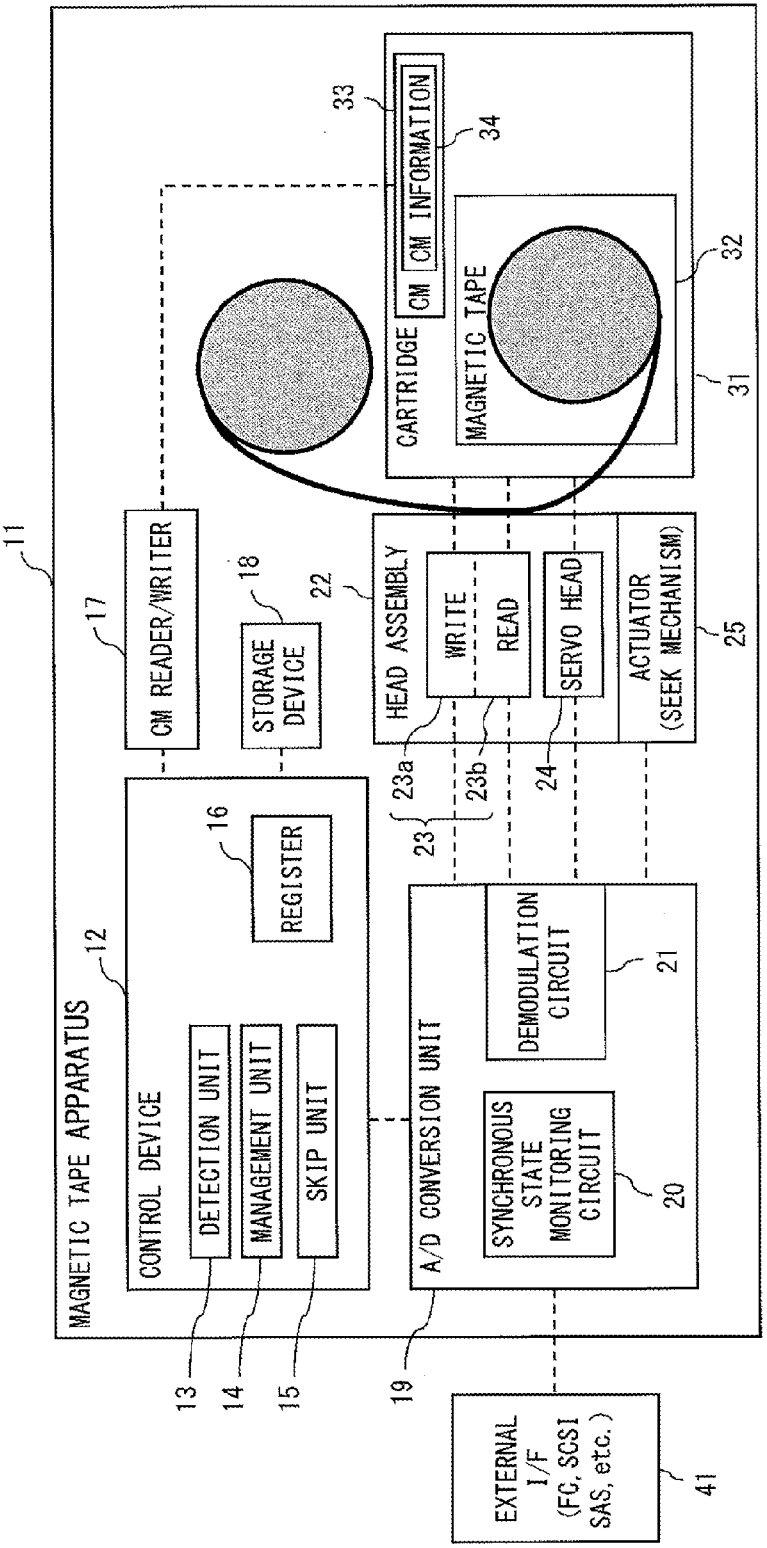
F I G. 2

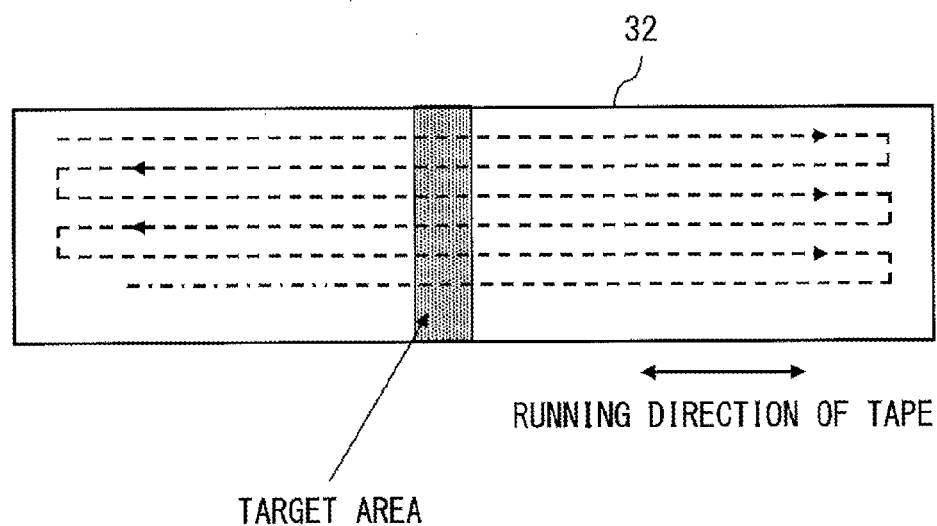
RUNNING DIRECTION OF TAPE
TARGET AREA
F I G. 3

| |
|---|
| EOD POSITION |
| ACCUMULATED WRITE VOLUME |
| APPLIED FLAG |
| NUMBER OF TIMES OF SPEED FLUCTUATIONS IN AREA 0 |
| NUMBER OF TIMES OF SPEED FLUCTUATIONS IN AREA 1 |
| NUMBER OF TIMES OF SPEED FLUCTUATIONS IN AREA 2 |
| NUMBER OF TIMES OF SPEED FLUCTUATIONS IN AREA 3 |
| NUMBER OF TIMES OF SPEED FLUCTUATIONS IN AREA 4 |
| . . . . . . . . |
| NUMBER OF TIMES OF SPEED FLUCTUATIONS IN AREA X |
| . . . |

FIG. 4

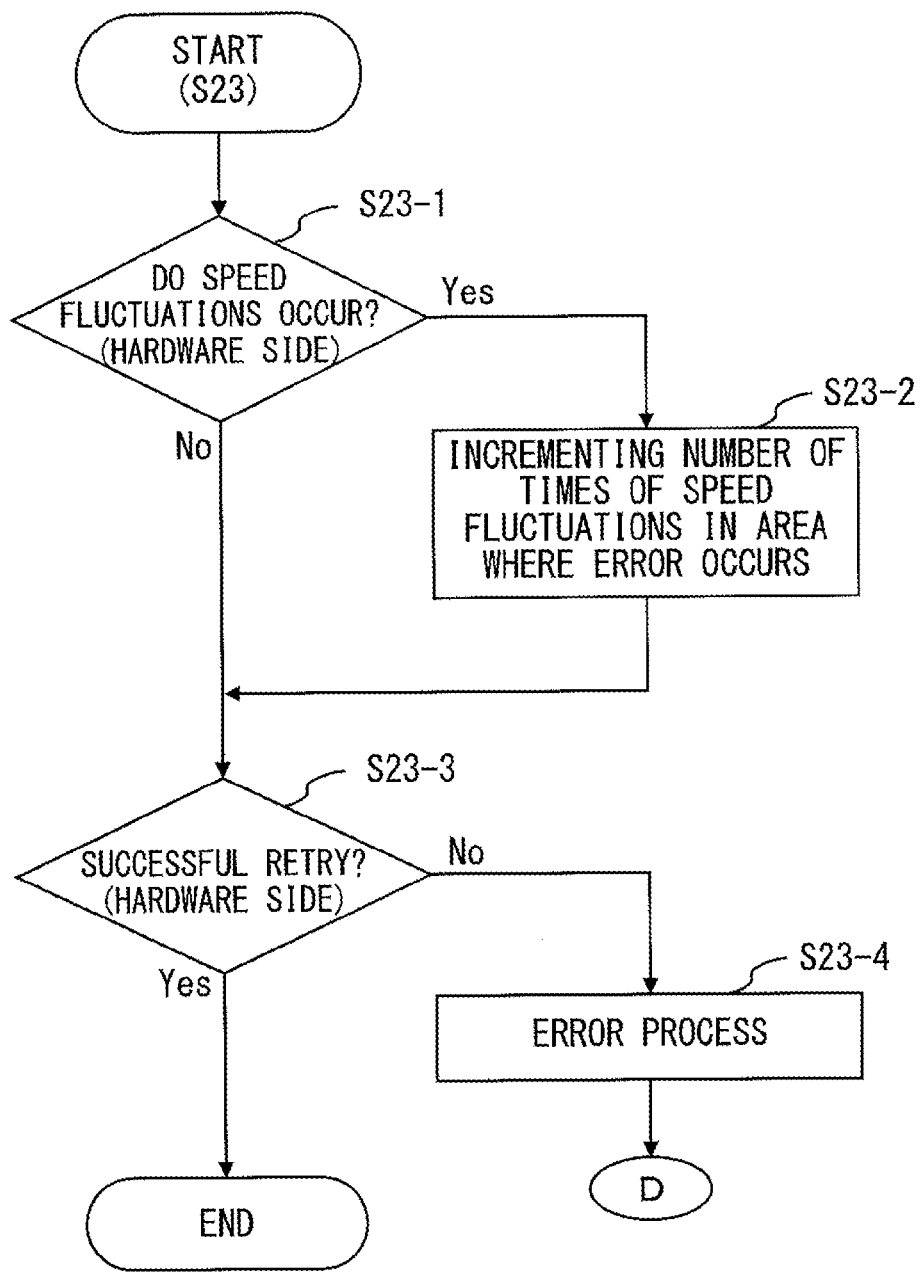
F I G. 6 F (1)

MAGNETIC TAPE CONTROL APPARATUS, RECORDING MEDIUM STORING A CONTROL PROGRAM, AND METHOD

CROSS-REFERENCE TO RELATED APPLICATION

This application is based upon and claims the benefit of priority of the prior Japanese Patent Application No. 2014-054752, filed on Mar. 18, 2014, the entire contents of which are incorporated herein by reference.

FIELD

The embodiment discussed herein is related to a magnetic tape control apparatus.

BACKGROUND

Magnetic tape devices that read and write data from and to a running magnetic tape while making the magnetic tape accommodated within a cartridge run are presented.

The magnetic tape devices cannot properly read and write data in some cases due to speed fluctuations caused by a change in a frictional state between a head and a tape due to a smudge or an abrasion of the head, or a degradation of the tape. To address such a problem, for example, the following techniques are present.

A first technique is a technique for avoiding an access to a degraded area even if the degraded area is present on a magnetic tape and for enabling an access only to an area other than the degraded area in a method for managing a degraded area of a magnetic tape (for example, Patent Document 1). With the first technique, the magnetic tape is configured as a set of partitions, each of which is configured with a management block, and a plurality of data blocks succeeding the management block.

A magnetic tape device control unit skips a partition when information indicating that an access to a partition is prohibited is recorded in a management information block present at the beginning of the partition when data is recorded to a magnetic tape. Then, the magnetic tape device control unit records the data to a data block succeeding a management information block of a subsequent partition. Next, the magnetic tape device control unit skips a partition and reproduces data in a data block succeeding a management information block of a subsequent partition, if the information indicating that an access to the partition is prohibited is recorded in a management information block present at the beginning of the partition when data is reproduced from the magnetic tape.

A second technique is a technique for detecting an abnormality of a running speed of a magnetic tape in a data recorder (for example, Patent Document 2). With the second technique, a recording head and a reproducing head are arranged at specified intervals in a running direction of a magnetic tape. Data recorded by the recording head is reproduced by the reproducing head, and fed to an error detection circuit. The error detection circuit makes a comparison between a reference time, which is calculated on the basis of the specified interval and an appropriate speed, and a data reproducing time, feeds an error signal to a driving circuit when the error detection circuit determines that the speed of the magnetic tape mismatches the appropriate speed, and stops the magnetic tape.

Patent Document 1: Japanese Laid-open Patent Publication No. 11-242802

Patent Document 2: Japanese Laid-open Patent Publication No. 2002-298470

SUMMARY

A magnetic tape control apparatus includes a control device that executes a process including: detecting an occurrence of speed fluctuations of a running magnetic tape for each recorded area from which a synchronization error is detected, when the synchronization error of a bit signal of a track is detected with a time lag between any of tracks of the running magnetic tape partitioned in units of recording areas; and setting the recording area as an unavailable area in accordance with a state where the speed fluctuations in the recording area occur.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates a magnetic tape control apparatus in one aspect of an embodiment.

FIG. 2 illustrates one example of a magnetic tape apparatus according to the embodiment.

FIG. 3 is an explanatory diagram of a target area in the embodiment.

FIG. 4 illustrates an example of CM information in the embodiment.

FIG. 6F is a flowchart (No. 6) illustrating the process of the control device of the magnetic tape apparatus according to the embodiment.

DESCRIPTION OF EMBODIMENT

Figure 5:
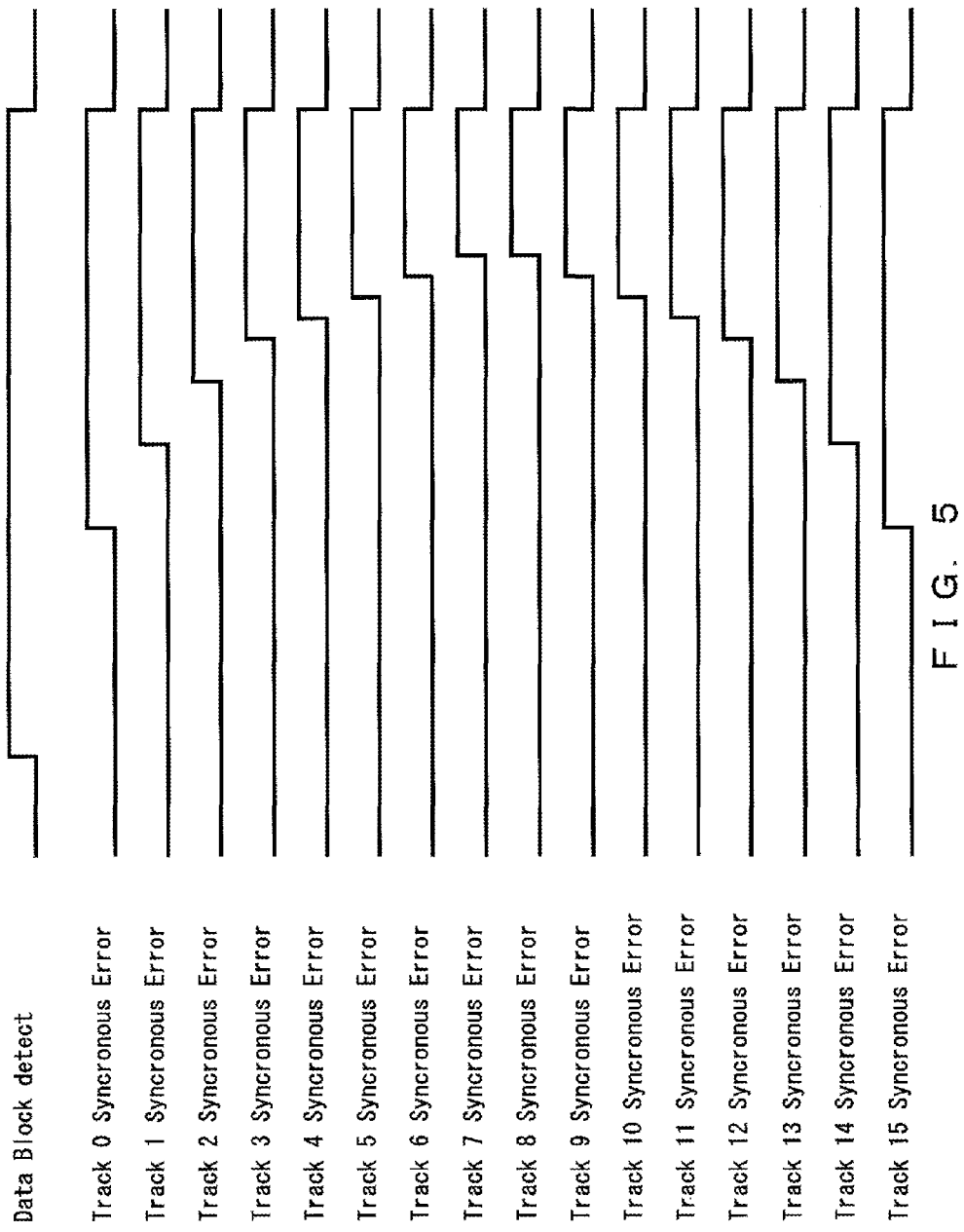
FIG. 5 illustrates an example of detection of Sync Error information in the embodiment.
Figure 6A:
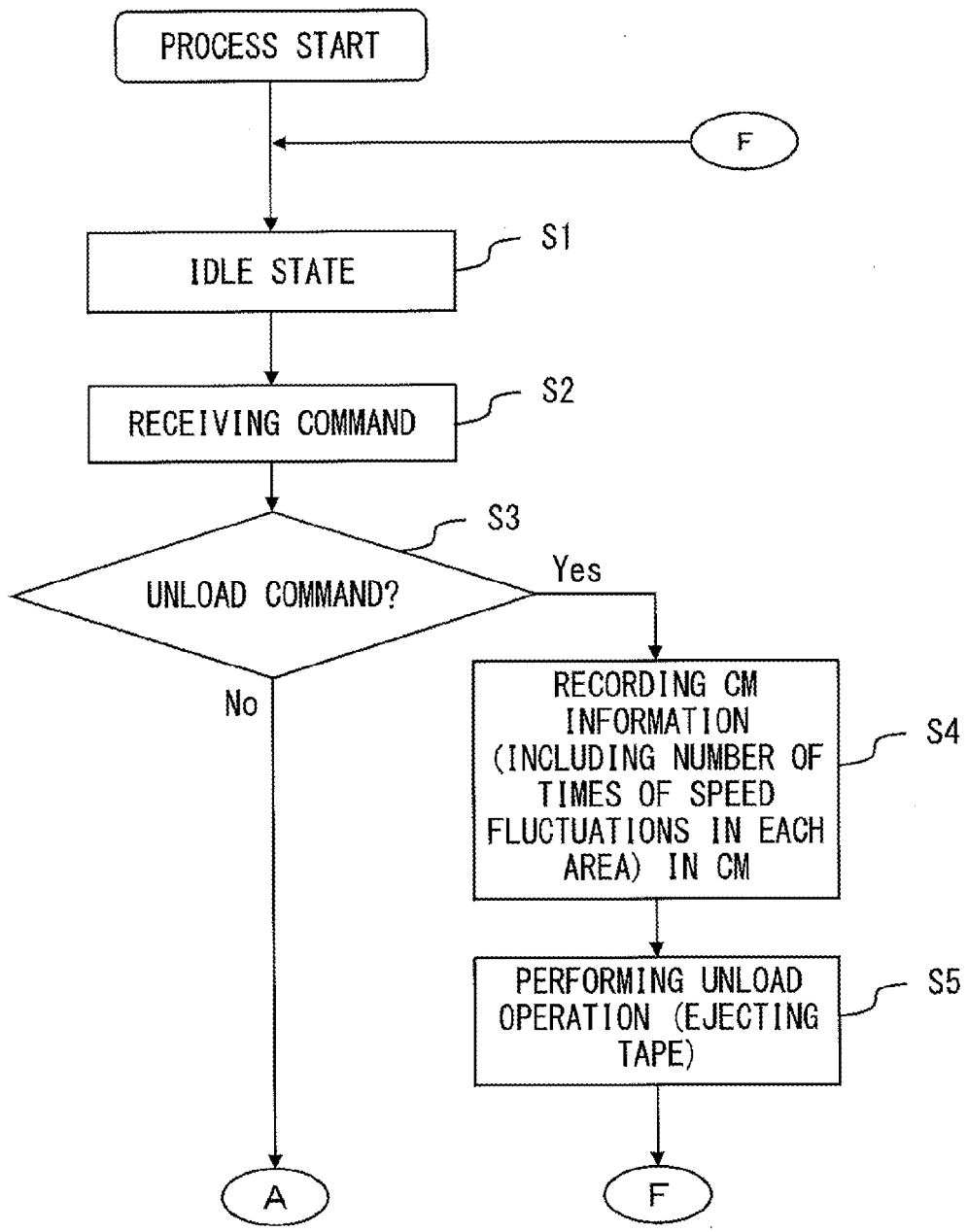
FIG. 6A is a flowchart (No. 1) illustrating a process of a control device of the magnetic tape apparatus according to the embodiment.
Figure 6B:
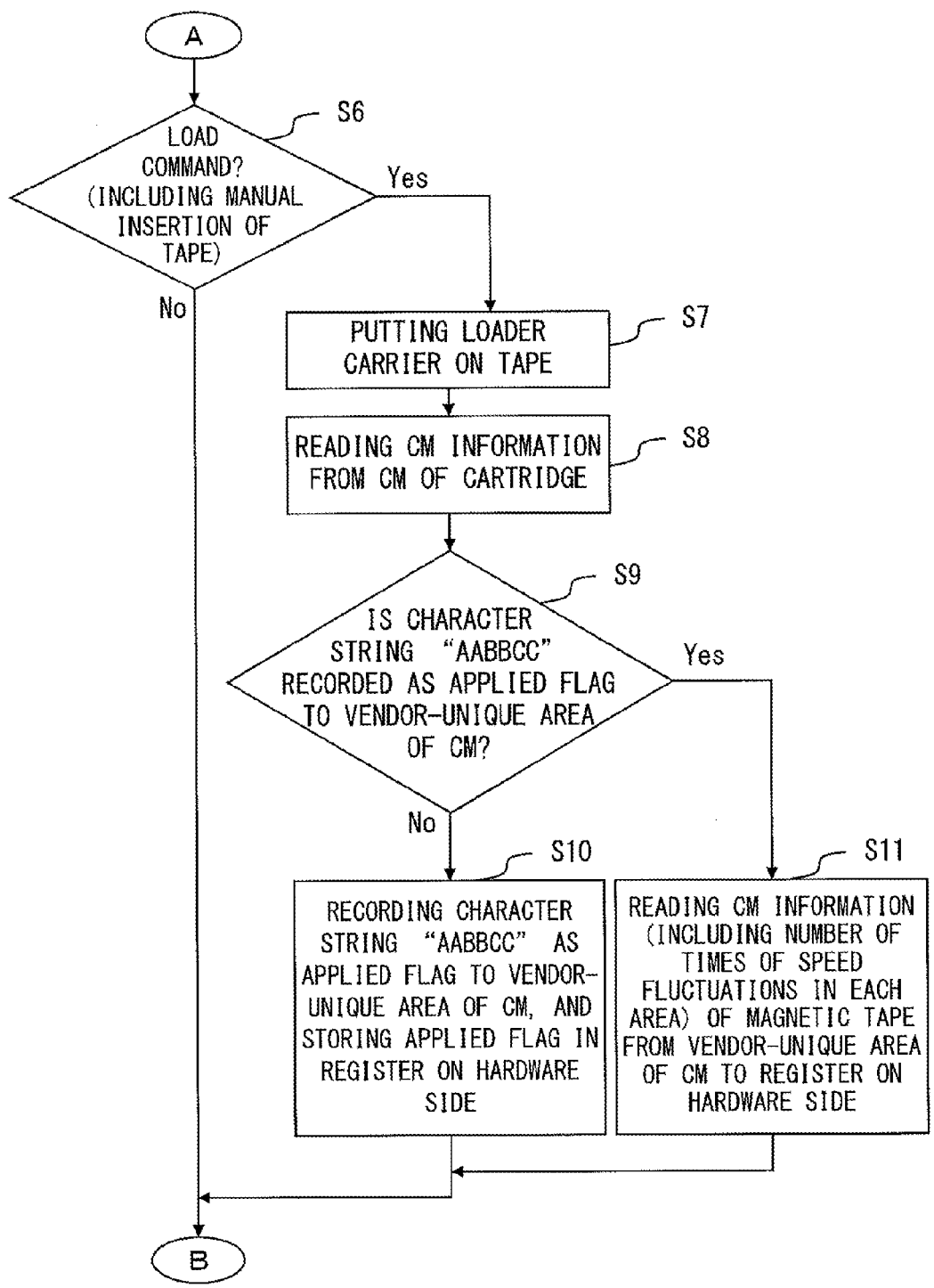
FIG. 6B is a flowchart (No. 2) illustrating the process of the control device of the magnetic tape apparatus according to the embodiment.
Figure 6C:
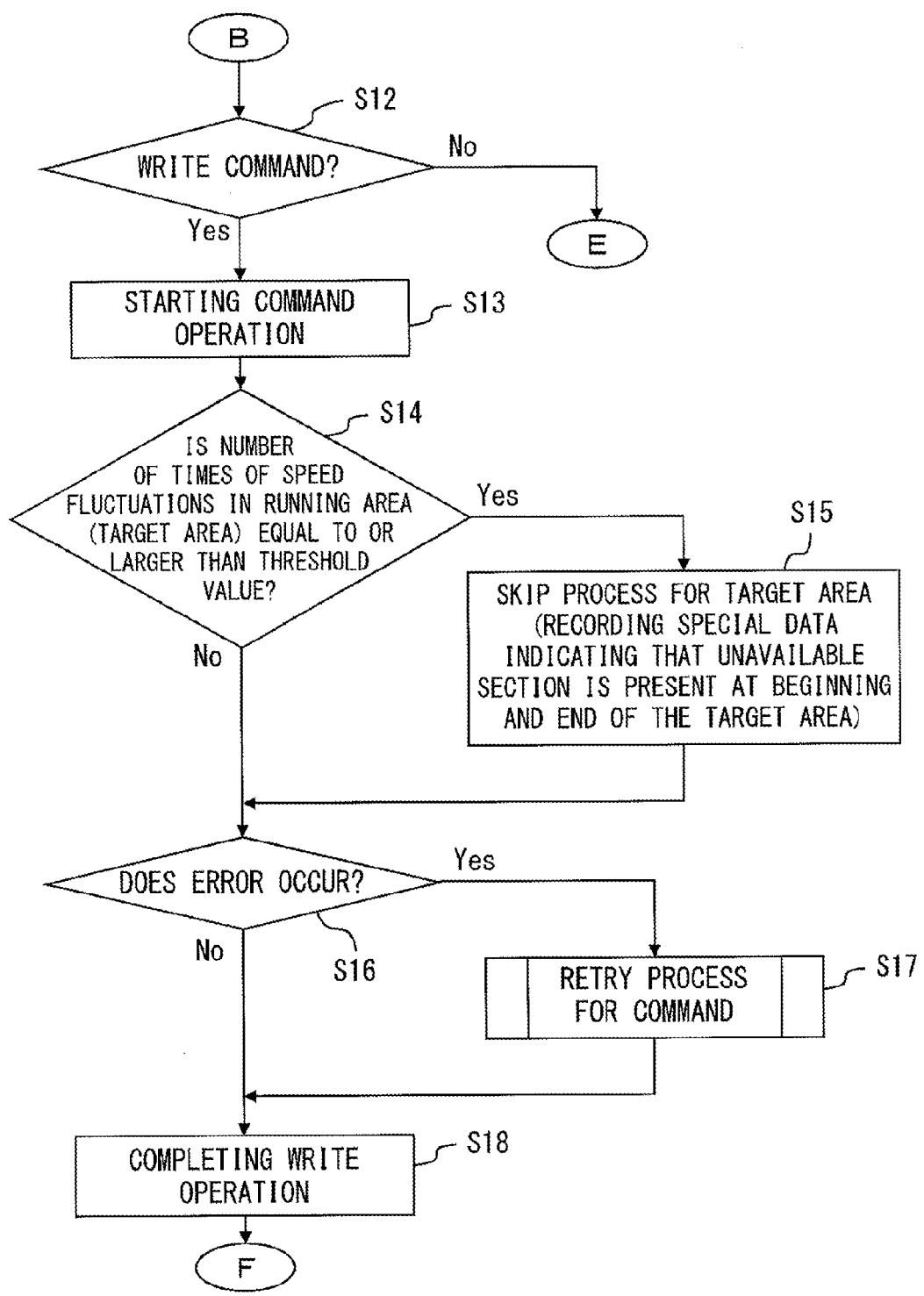
FIG. 6C is a flowchart (No. 3) illustrating the process of the control device of the magnetic tape apparatus according to the embodiment.
Figure 6D:
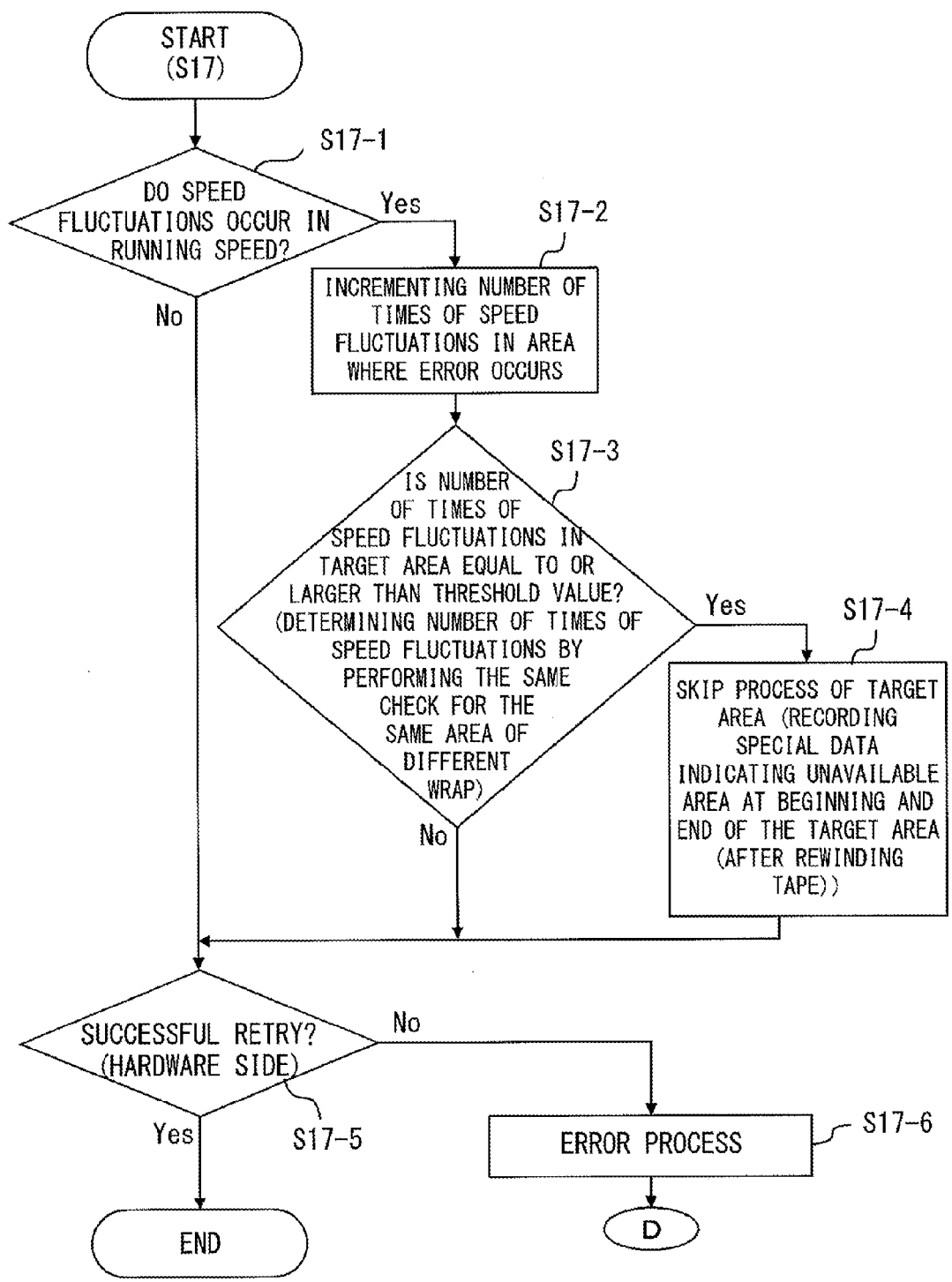
FIG. 6D is a flowchart (No. 4) illustrating the process of the control device of the magnetic tape apparatus according to the embodiment.
Figure 6E:
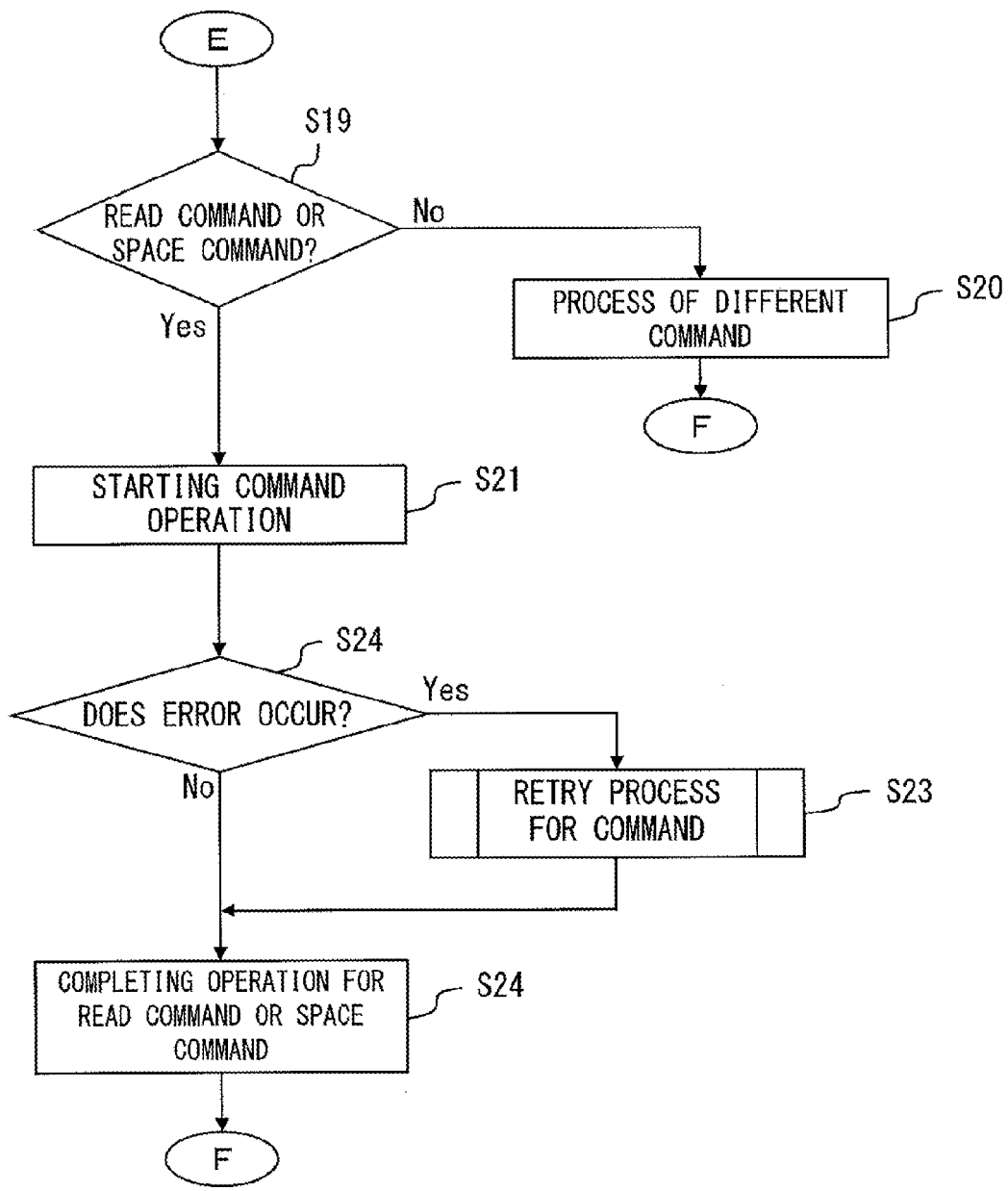
FIG. 6E is a flowchart (No. 5) illustrating the process of the control device of the magnetic tape apparatus according to the embodiment.
Figure 6G:
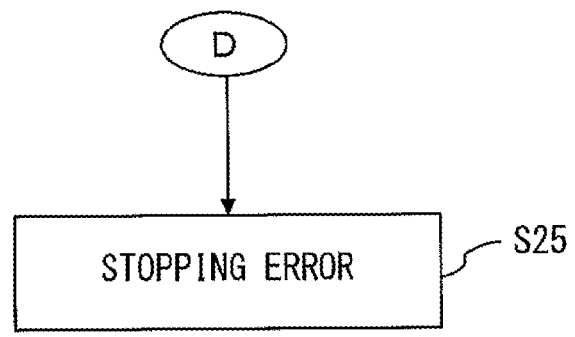
FIG. 6G is a flowchart (No. 7) illustrating the process of the control device of the magnetic tape apparatus according to the embodiment.

In a case where a magnetic tape apparatus is used, a failure that occurs when a degraded magnetic tape is used and disables a read and a write from and to a magnetic tape due to speed fluctuations caused by frictional variations between a head and the magnetic tape can possibly occur. When such a failure occurs on a magnetic tape, the reliability of data recorded on the magnetic tape is degraded.

One aspect of an embodiment provides a technique for improving the reliability of data recorded on a magnetic tape.

As described above, a failure caused by speed fluctuations of a running magnetic tape degrades the reliability of data recorded on a magnetic tape. Moreover, when a combination of a magnetic tape apparatus and a magnetic tape medium is changed, reproducibility of the failure is significantly degraded in many cases. Additionally, since a dropout of a read waveform is not caused when speed fluctuations occur, it becomes difficult to determine a cause of an error.

Accordingly, this embodiment realizes the following magnetic tape apparatus. Namely, the magnetic tape apparatus according to the embodiment detects an event of speed fluctuations caused by frictional variations between a head and a degraded tape when the degraded tape is used, and generates information (degraded area information) about a degraded area. Then, the magnetic tape apparatus records the generated degraded area information in a cartridge memory (hereinafter abbreviated to "CM") within a tape cartridge. At and after the next time, the magnetic tape apparatus reads the degraded area information from the CM, and recognizes a degraded portion on the tape on the basis of the read degraded area information. When the number of times that speed fluctuations within the area occur exceeds a threshold value, the magnetic tape apparatus handles the area as an unavailable area. This improves the reliability of data recorded on the tape.

Additionally, with a magnetic tape apparatus of a linear type, in order to increase a storage capacity, a head goes back and forth on a tape by a plurality of times while a position of the head is being shifted (wraps are changed) at each turn of the head. Accordingly, the head is made to go back and forth the degraded portion of the magnetic tape by the plurality of times in the magnetic tape apparatus. There is a high probability that speed fluctuations occur in the degraded portion. Therefore, when speed fluctuations are detected in a certain wrap, performance is prevented from being degraded by handling also the same area of a different wrap as an unavailable area.

FIG. 1 illustrates an example of a magnetic tape control apparatus according to the embodiment. The magnetic tape control apparatus 1 includes a detection unit 2 and a setting unit 3. The magnetic tape control apparatus 1 may be called the magnetic tape apparatus.

When a synchronization error of a bit signal in a track is detected with a time lag between any of tracks of a running magnetic tape partitioned in units of recording areas, the detection unit 2 detects an occurrence of speed fluctuations of the running magnetic tape for each recording area from which the synchronization error is detected. Specifically, when the synchronization error is detected earlier in a track closer to one of edges of the magnetic tape in a shorter direction than in a track closer to a center of the magnetic tape, the detection unit 2 detects the occurrence of speed fluctuations of the running magnetic tape for each recording area from which the synchronization error is detected. As one example of the detection unit 2, a control device 12 that functions as a detection unit 13 is cited.

The setting unit 3 sets a recording area as an unavailable area in accordance with a state of the occurrence of speed fluctuations of a recording area. As one example of the setting unit 3, the control device 12 that functions as a skip unit 15 is cited.

The magnetic tape control apparatus 1 further includes a counting unit 4. The counting unit 4 counts the number of times that a synchronization error is detected for each recording area from which a synchronization error is detected. As one example of the counting unit 4, the control device 12 that functions as a management unit 14 is cited. In this case, when a counted number of times that a synchronization error is detected is equal to or larger than a threshold value in a write access, the setting unit 3 sets the recording area as an unavailable area, and performs a write access to the next recording area.

With such a configuration, the reliability of data recorded on a magnetic tape can be improved.

FIG. 2 illustrates an example of the magnetic tape apparatus according to the embodiment. The magnetic tape apparatus 11 is, for example, a magnetic tape apparatus of a linear-serpentine method. By loading a cartridge 31 having a magnetic tape 32 into a slot of the magnetic tape apparatus 11, the magnetic tape 32 can be read and written.

The magnetic tape apparatus 11 can be coupled communicatively with a higher-order device by using an external interface (I/F) 41 compliant with a standard such as FC, SCSI, SAS, or the like. Here, the FC is an acronym of Fiber Channel. The SCSI is an acronym of Small Computer System Interface. The SAS is an acronym of Serial Attached SCSI.

The magnetic tape apparatus 11 includes the control device 12, a CM reader/writer 17, a storage device 18, an A/D conversion unit 19, a head assembly 22, and an actuator 25.

The head assembly 22 is an aggregation of heads such as a read/write head 23 and a servo head 24. The read/write head 23 includes a write head 23a that writes data to the magnetic tape 32, and a read head 23b that reproduces data recorded on the magnetic tape 32. The write head 23a writes data to one or more data bands of the magnetic tape 32 in accordance with an electric signal input from the control device 12. Moreover, the read head 23b reproduces an electric signal in accordance with data recorded in one or more data bands of the magnetic tape 32, and outputs the reproduced signal to the control device 12.

The servo head 24 is intended to align a position of the read/write head 23 with respect to the shorter direction of the magnetic tape. The servo head 24 reproduces an electric signal in accordance with data stored in a servo band of the magnetic tape 32, and outputs the reproduced signal to the control device 12. The electric signal reproduced by the servo head 24 is referred to as a "servo signal".

The actuator 25 moves the position of the head assembly 22 in a width direction of the magnetic tape 32 in accordance with a control signal output from the control device 12.

The A/D (analog-to-digital) conversion unit 19 converts an analog signal read by the head assembly 22 into a digital signal. The A/D conversion unit 19 includes a synchronous state monitoring circuit 20, and a demodulation circuit 21.

The demodulation circuit 21 demodulates the analog signal read by the read head 23b or the servo head 24 into a digital signal.

The synchronous state monitoring circuit 20 monitors a synchronous state of a bit signal read from one or more data tracks on the magnetic tape 32, and detects an asynchronous bit signal as synchronization error information. The bit signal of each data track, which is read by the read head 23b, is detected within a specified time frame (phase) by a PLL (Phase Locked Loop) circuit not illustrated. The synchronous state monitoring circuit 20 monitors the bit signal detected out of the specified time frame (phase) set by the PLL circuit for each data track. As a result, synchronization between signals of tracks is maintained. When the data signal of each data track is detected out of the specified time frame, the synchronous state monitoring circuit 20 notifies the control device 12 of synchronization error information (Sync Error) indicating that a synchronous state is not maintained for data tracks.

The CM reader/writer 17 reads CM information 34 stored in the CM 33 included in the cartridge 31, and notifies the control device 12 of the CM information 34 read from the CM 33. Moreover, the CM reader/writer 17 writes, to the CM 33, specified information (including the number of times (the number of times of speed fluctuations in a unit storage area of the magnetic tape 32)) stored in the register 16 on the basis of an instruction issued from the control device 12.

The storage device 18 stores a program according to the embodiment, which is executed by a processor included in the control device 12 and intended to realize the operations of the magnetic tape apparatus 11 according to the embodiment, and the like. A nonvolatile memory such as an EEPROM (Electrically Erasable Programmable Read-Only Memory) or the like may be available as the storage device 18. The program according to the embodiment may be stored, for example, in the storage device 18 from a program provider side via a communication network. Moreover, the program according to the embodiment may be stored on a marketed and distributed portable storage medium. In this case, the portable storage medium may be set in a reading device, read by the control device 12 or a computer, and executed. As the portable storage medium, storage media in various forms such as a CD-ROM, a flexible disc, an optical disc, a magneto-optical disc, an IC card, a USB memory device, and the like are available.

The control device 12 reads and writes data from and to the magnetic tape 32 by controlling the head assembly 22 and the actuator 25. The control device 12 realizes operations of the magnetic tape apparatus 11 to be described later by executing the program according to the embodiment, which is stored in the storage device 18.

For example, upon receipt of a write command from a higher-order device via the external interface 41, the control device 12 outputs an electric signal according to write data received along with the write command to the write head 23*a* via the A/D conversion unit 19. Then, the write head 23*a* writes the write data to the magnetic tape 32 in accordance with the input electric signal.

Additionally, upon receipt of a read command from the higher-order device via the external I/F 41, the control device 12 converts the electric signal that the read head 23*b* reproduces from the magnetic tape 32 into digital data via the A/D conversion unit 19, and reads the data. The control device 12 outputs the read data to the higher-order device via the external I/F 41.

Furthermore, the control device 12 calculates a position of the head assembly 22 in the shorter direction of the magnetic tape 32 from a servo signal reproduced by the servo head 24. The control device 12 calculates an off-track amount from a difference between the calculated position of the head assembly 22 and a target position, namely, a position at which the read/write head 23 can read or write data in a desired data track included in the magnetic tape 32. Then, the control device 12 adjusts the position of the head assembly in the shorter direction of the magnetic tape 32 by controlling the actuator 25 to reduce the off-track amount.

Still further, the control device 12 controls a speed and a tape tension of the magnetic tape 32 by monitoring the number of revolutions, an electric current value and the like of a motor of a reel, which is used to make the magnetic tape 32 run and is not illustrated. For example, the control device 12 can control the speed and the tape tension of the magnetic tape 32 on the basis of the number of revolutions, the electric current value and the like of the motor that revolves the reel, which winds the magnetic tape 32, on the cartridge 31 side.

The control device 12 includes the register 16. The control device 12 stores, in the register 16, the CM information 34 that the CM reader/writer 17 reads from the CM 33. As the register 16, a nonvolatile memory such as a RAM (Random Access Memory) or the like is available.

The cartridge 31 used in this embodiment includes the magnetic tape 32, and the CM (Cartridge Memory) 33. The magnetic tape 32 is accommodated in the cartridge 31 by being wound by the reel.

As the cartridge 31, a cartridge compliant with LTO (Linear Tape-Open) standard is available. The magnetic tape 32 compliant with the LTO standard includes a plurality of data bands, and servo bands arranged to sandwich the data bands. Each of the data bands includes a plurality of data tracks.

Here, PBOT (Physical Beginning of Tape) indicates a physical beginning of the tape, whereas PEOT (Physical End of Tape) indicates a physical end of the tape.

A data track in which data is stored in the running direction of the magnetic tape from the PBOT to the PEOT, or a data track in which data is stored from the PEOT to the PBOT is called a "halfwrap". The halfwrap will be described later.

Additionally, LBOTn (Logical Beginning of Tape halfwrap n) indicates the beginning of data recorded in each halfwrap. LEOTn (Physical End of Tape halfwrap n) indicates the end of data when the data is recorded in the entire halfwrap.

Here, as the magnetic tape apparatus 11 according to the embodiment, for example, a magnetic tape apparatus of a serpentine method is available. In this case, the magnetic tape apparatus 11 stores data in a data track in the running direction of the magnetic tape from the LBOTn of the tape, and stores the data toward the LEOTn. Moreover, the magnetic tape apparatus 11 switches to a halfwrap (n+1) by turning at LEOTn Tape of the halfwrap, and performs a back-and-forth operation for storing the data in a data track of the halfwrap from LBOTn+1 toward LEOTn+1.

The CM 33 is a storage device that stores the CM information 34 including EOD (End Of Data), an accumulated write volume, the number of times that speed fluctuations (the number of times of speed fluctuations) occur in a unit storage area of the magnetic tape 32, and the like, which will be described later. As the CM 33, for example, a storage element of a non-contact type, such as an RFID tag or the like, is available.

Note that the magnetic tape apparatus 11 includes a loading mechanism that sets the cartridge 31 at a specified position in accordance with a load command issued from a higher-order device although this is not illustrated. The magnetic tape apparatus 11 further includes a thread mechanism for ejecting the magnetic tape 32 set in one reel and for setting the ejected magnetic tape 32 in another reel. Moreover, the loading mechanism can move the cartridge 31 to a position from which the cartridge 31 can be ejected by canceling the state, in which the head assembly 22 can read and write data from and to the magnetic tape 32, in accordance with an unload command issued from the higher-order device.

In this embodiment, the control device 12 functions as a detection unit 13, a management unit 14, and a skip unit 15 by reading the program according to the embodiment from the storage device.

The detection unit 13 executes the following process when a synchronization error is caused by asynchronous bit signals, which are read from tracks and detected by the synchronous state monitoring circuit 20. Namely, the detection unit 13 identifies an occurrence of speed fluctuations of the magnetic tape upon detecting a synchronous error at different timings in at least any two, preferably, three tracks. For example, a property is exhibited such that a synchronization error is caused by skew fluctuations of a magnetic tape in tracks closer to each of the edges in the shorter direction of the magnetic tape earlier than in a track closer to the center when an access error to the magnetic tape 32 occurs. The detection unit 13 identifies the speed fluctuations of the magnetic tape as a cause of the access error by using the property, namely, in accordance with Sync Error information notified from the synchronous state monitoring circuit 20.

In this embodiment, speed fluctuations are identified by using the property such that a synchronization error is caused in tracks closer to each of the edges in the shorter direction of a magnetic tape earlier than in a track closer to the center due to skew fluctuations of the magnetic tape. Namely, a case where one of the edge sides is pulled by the skew fluctuations of the magnetic tape in three tracks including the track at the center, and the tracks closer to each of the edges is considered. In this case, the speed of the track on either of the edge sides increases with respect to the track at the center, whereas the speed of the track on the other edge side decreases. As a result, a data signal of the tracks on both of the edges having large speed fluctuations is detected significantly out of a specified time frame, whereby a synchronization error is detected at an early timing.

The management unit 14 counts the number of times of speed fluctuations in the unit of a certain tape length of a cartridge when a cause of an occurrence of an access error is speed fluctuations of the magnetic tape, and records, in the register 16, the counted number of times of speed fluctuations.

The management unit 14 stores, in a specified storage area of the CM 33, the CM information 34 including the number of times of speed fluctuations, which is held in the register 16, by using the CM reader/writer 17 when the cartridge 31 is unloaded.

The management unit 14 restores (reloads), in the register 16, the CM information 34 (the number of times of speed fluctuations) stored in the CM 33 by using the CM reader/writer 17 when the cartridge 31 is loaded.

The skip unit 15 calculates a total sum of the number of times of speed fluctuations of all halfwraps at the same tape position in a direction vertical to the proceeding direction of the tape on the basis of the number of times of speed fluctuations, which is recorded in the register 16, when a write access (a write to the tape medium) is performed. Here, a unit recording area including the current position of the tape and the same position in the direction vertical to the proceeding direction of the tape is referred to as a target area. When the total sum of the number of times of speed fluctuations of all the halfwraps at the same tape position exceeds a specified threshold value, the skip unit 15 determines that the target area is a write-prohibited area, skips the target area by recording, at the beginning of the target area, special data indicating that an unavailable section starts, and accesses the next unit recording area by recording, at the very end of the target area, special data indicating that the unavailable section ends.

FIG. 3 is an explanatory diagram of the target area in the embodiment. In a case of the magnetic tape apparatus of the linear-serpentine method, the head assembly 22 relatively goes back and forth in the longer direction of the magnetic tape as illustrated in FIG. 3. As described above, a set of data tracks in a forward path and a backward path of a track, in which the head assembly 22 goes back and forth, is referred to as a halfwrap. The head assembly 22 slides in an up-and-down direction when the running direction of the tape is switched, and the write head 23*a*, the read head 23*b*, and the servo head 24 move to the next contiguous halfwrap.

As illustrated in FIG. 3, the target area is a unit recording area including the same tape position in the direction vertical to the proceeding direction of the tape, and straddles all the halfwraps where the head assembly 22 is present at a certain position. When speed fluctuations in a running halfwrap in the target area are detected, the management unit 14 obtains the total sum of the number of times of speed fluctuations of all the halfwraps in the target area by adding the detected speed fluctuations to the number of times of speed fluctuations, which is stored in the register 16. When the total sum of the number of times of speed fluctuations of all the halfwraps in the target area exceeds a threshold value, the skip unit 15 determines that the target area is a write-prohibited area. In this case, the skip unit 15 skips the target area by recording, at the beginning of the target area, special data indicating that an unavailable section starts, and accesses the next unit recording area by recording, at the very end of the target area, special data indicating that the unavailable section ends.

FIG. 4 illustrates an example of CM information in this embodiment. The CM information 34 includes data entries such as an "EOD position", an "accumulated write volume", an "applied flag of this embodiment", and "number of times of speed fluctuations in area X (X=0 to n (n: arbitrary integer))".

In the "EOD position", position information of EOD is stored. The EOD is data indicating a write end position of data when the data is written to the magnetic tape 32 in accordance with a write command or the like.

In the "accumulated write volume", a volume (accumulated value) written to the magnetic tape 32 is stored.

In the "applied flag", a flag indicating whether this embodiment is applied is stored. This embodiment is assumed to be applied, for example, when the flag is set to "AABBCC".

In the "number of times of speed fluctuations in area X", the number of times (accumulated value) that speed fluctuations occur in a tape length unit area of the magnetic tape 32 is stored. The magnetic tape 32 is assumed to be partitioned into unit areas indicated by, for example, areas 0 to X (X=0 to n (n: an arbitrary integer)). For example, in the "number of times of speed fluctuations in", the number of times (an accumulated value) that speed fluctuations occur in an on the magnetic tape 32, namely, the total sum of the number of times of speed fluctuations of all the halfwraps in the is stored.

FIG. 5 illustrates an example of detection of Sync Error information in this embodiment. FIG. 5 illustrates the example of Sync Error information in this embodiment. FIG. 5 illustrates one example of the Sync Error information generated when the magnetic tape 32 having 16 data tracks is made to run.

In the example of this embodiment, when the tape runs in one halfwrap, the write head 23*a* writes data to 16 data tracks, and the read head 23*b* read data from the 16 data tracks. However, the number of data tracks is not limited to 16. As described above, a bit signal of each data track read by the read head 23*b* is detected by the PLL (Phase Locked Loop) circuit within a specified time frame. When the data signal of each data track is detected significantly out of a specified time frame, Sync Error information indicating that a synchronous state is not maintained for the data tracks is generated as illustrated in FIG. 5.

As described above, when an access error to the cartridge 31 is caused by skew fluctuations of the magnetic tape 32, the speed of a track on one of the edge sides increases, and that of the other edge side decreases with respect to a track at the center. As a result, data signals of the tracks on both of the edge sides where speed fluctuations largely occur are detected significantly out of a specified time frame, so that a synchronization error is detected at an early timing. Consequently, the property is exhibited such that a synchronization error is caused in tracks closer to each of the edges in the shorter direction of the magnetic tape earlier than in a track closer to the center due to skew fluctuations of the magnetic tape 32. Namely, as illustrated in FIG. 5, Sync Error information rises earliest in the tracks on both of the edge sides, and gradually rises closer to the center with a larger lag, so that an arch-shaped Sync Error information rises as a whole in many cases. The control device 12 that functions as the detection unit 13 identifies the speed fluctuations as a cause of an access error by using the property, namely, in accordance with the Synch Error information notified by the synchronous state monitoring circuit 20.

FIGS. 6A to 6F are flowcharts illustrating a process of the control device of the magnetic tape apparatus according to this embodiment. When the magnetic tape apparatus 11 is powered on, the control device 12 enters into an idle state, namely, a state of waiting for a command issued from the higher-order device (S1). Then, upon receipt of the command from the higher-order device via the external I/F 41 (S2), the control device 12 determines a type of the received command (S3).

When the command received in S2 is an unload command in a state where the cartridge 31 is loaded ("YES" in S3), the control device 12 writes CM information, which is stored in the register 16, to the CM 33 (S4). As a result, the CM information 34 stored in the CM 33 is updated. Here, the CM information 34 includes the number of times of speed fluctuations of each area, an EOD position, an accumulated write volume, and the like.

Then, the control device 12 unloads the cartridge 31 being loaded into the magnetic tape apparatus 11 (S5). In this unloading process, the control device 12 makes the cartridge 31 being loaded into the magnetic tape apparatus 11 physically ejectable. Then, the control device 12 reenters the idle state.

When the command received in S2 is not the unload command ("NO" in S3), the control device 12 shifts the process to S6. When the command received in S2 is a load command ("YES" in S6), the control device 12 moves a loader carrier for conveying the cartridge 31 down on the magnetic tape 32 (S7). The control device 12 loads the cartridge 31 into the magnetic tape apparatus 11. Note that the load command may include a load instruction generated on the basis of an insertion of the cartridge 31 into the magnetic tape apparatus 11 in addition to the load command received from the higher-order device. Moreover, the load command includes a detection signal from a sensor, not illustrated, for detecting that the cartridge 31 is manually inserted, a load command output by a tape library device coupled communicatively with the magnetic tape apparatus, 11, and the like.

Upon completion of loading the cartridge 31, the control device 12 reads the CM information 34 from the CM 33 within the loaded cartridge 31 (S8). The control device 12 determines, for example, whether a character string "AABBCC" is recorded as an applied flag for determining whether this embodiment is applied is recorded in a vendor-unique area of the CM 33 (S9). Here, the vendor-unique area indicates a storage area independently available to each vendor.

When the character string "AABBCC" is not recorded as the applied flag in the vendor-unique area of the CM 33 ("NO" in S9), the control device 12 executes the following process. Namely, the control device 12 records the character string "AABBCC" as the applied flag in the vendor-unique area of the CM 33, and stores the applied flag in the register 16 (S10).

When the character string "AABBCC" is recorded as the applied flag in the vendor-unique area of the CM. 33 ("YES" in S9), the control device 12 reads the CM information 34 from the vendor-unique area of the CM 33 into the register 16 (S11). As described above, the CM information 34 includes the number of times of speed fluctuations of each area of the magnetic tape.

When the command received in S2 is not the load command ("NO" in S6), the control device 12 shifts the process to S12. When the command received in S2 is not a write command ("NO" in S12), the control device 12 shifts the process to S19.

When the command received in S2 is a write command ("YES" in S12), the control device 12 starts operations for the write command (S13).

The control device 12 reads the number of times of speed fluctuations of an area of a magnetic tape going to run from now on from the CM information 34 stored in the register 16. The control device 12 determines whether the number of times of speed fluctuations of the area of the magnetic tape going to run from now on is equal to or larger than a threshold value prestored in the register 16 or the storage device 18 (S14).

When the number of times of speed fluctuations of the area (target area) of the magnetic tape going to run from now on is equal to or larger than the threshold value ("YES" in S14), the control device 12 executes a process for skipping a target area (S15). Namely, the control device 12 records, at the beginning of the target area, special data indicating that an unavailable section starts and skips the target area. Then the control device 12 writes the data to the next unit recording area after recording, at the very end of the target area, special data indicating that the unviable section ends.

When the number of times of speed fluctuations of the area (target area) of the magnetic tape going to run from now on is smaller than the threshold value ("NO" in S14), the control device 12 determines whether an access error occurs in the magnetic tape apparatus 11 during the write command operation (S16). When the control device 12 determines that the access error does not occur ("NO" in S16), the control device 12 completes the write operation (S18).

When the control device 12 determines that the access error occurs in S16 ("YES" in S16), the control device 12 executes a process for retrying the write command (S17). With this retry process, the control device 12 executes the write command at the beginning or a midpoint of the write command process when needed. When the control device 12 executes the retry process of the write command, it determines whether speed fluctuations occur in the running speed of the magnetic tape 32 on the basis of a result of an output from the synchronous state monitoring circuit 20 (S17-1). Here, the control device 12 monitors error information (Sync Error) of a synchronous signal for each track by using the synchronous state monitoring circuit 20. Then, the control device 12 determines that speed fluctuations have occurred when Sync Error is caused on tracks on both of the edges on the shorter side of the magnetic tape earlier than in the track closer to the center as described above with reference to FIG. 5.

When the speed fluctuations occur in the magnetic tape 32 ("YES" in S17-1), the control device 12 increments, in the register 16, the number of times of speed fluctuations in an area corresponding to the area where the error occurs (target area) (S17-2).

The control device 12 determines whether the number of times of speed fluctuations of the target area is equal to or larger than the threshold value (S17-3). At this time, the control device 12 executes the process of S20 also for the same area of a different wrap. This is because the magnetic tape apparatus 11 of the linear method repeatedly goes back and forth and records (wraps) data, and makes the head assembly 22 run in the same area of the magnetic tape 22 by a plurality of times, leading to a high probability that speed fluctuations occur even when the head assembly 22 runs in the same area of the different wrap. As a result, the performance of the magnetic tape is prevented from being degraded.

When the number of times of speed fluctuations of the target area is equal to or larger than the threshold value ("YES" in S17-3), the control device 12 executes the process for skipping a target area, namely, records special data indicating an unavailable section at the beginning and the very end of the target area (S17-4). In this case, the control device 12 records the special data after the magnetic tape 32 is rewound towards the beginning of the unavailable area. Then, the control device 12 skips the target area, and writes the data to the next unit recording area.

When the speed fluctuations do not occur in the running speed of the magnetic tape 32 after the control device 12 executes the retry process for a write command ("NO" in S17-1), the control device 12 determines whether the write command has been successfully retried (S17-5). When the write command has been unsuccessfully retried ("NO" in S17-5), the control device 12 executes an error process corresponding to the caused access error (S17-6). As a result, the magnetic Tape Apparatus 11 is stopped by the error (S25).

When the write command has been successfully retired ("YES" in S17-5), the control device 12 completes the write operation (S18). Then, the control device 12 reenters the idle state.

Alternatively, when the command received in S2 is neither the read command nor the space command in S19 ("NO" in S19), the control device 12 executes a process corresponding to the command (S25). Then, the control device 12 reenters the idle state. Here, examples of the space command include commands that finds the start of data across a space, such as a space command, a backspace command, a space file command, a backspace file command and the like, or commands that perform a search, such as a locate command and the like.

When the command received in S2 is either the read command or the space command in S19 ("YES" in S19), the control device 12 starts an operation for the read command or the space command (S21).

The control device 12 determines whether an access error occurs in the magnetic tape apparatus 11 while the read command or the space command is being executed (S22).

When the control device 12 determines that the access error occurs in S22 ("YES" in S22), the control device 12 executes the retry process for the read command or the space command. With this retry process, the control device 12 executes the read command or the space command at the start or a midpoint of the process for the read command or the space command when needed. When the retry process for the read command or the space command is executed, the control device 12 determines whether the speed fluctuations occur in the running speed of the magnetic tape 32 on the basis of a result of an output from the synchronous state monitoring circuit (S23-1). Here, the control device 12 monitors error information (Sync Error) of a synchronous signal of each track by using the synchronous state monitoring circuit 20. As described above with reference to FIG. 5, when Sync Error occurs in tracks on both of the edges on the shorter side of a tape earlier than in a track closer to the center, the control device 12 determines that the speed fluctuations occur.

When the speed fluctuations occur in the running speed of the magnetic tape 32 ("YES" in S23-1), the control device 12 increments, in the register 16, the number of times of speed fluctuations of an area corresponding to the area (target area) where the error has occurred (23-2).

The control device 12 determines whether the read command or the space command has been successfully retried (S23-3). When the read command or the space command has been unsuccessfully retried ("NO" in S23-3), the control device 12 executes an error process corresponding to the caused access error (S23-4). As a result, the magnetic Tape Apparatus 11 is stopped by the error (S25).

When the read command or the space command has been successfully retired ("YES" in S23-3), the control device 12 completes the command operation according to the read command or the space command (S24). Then, the control device 12 reenters the idle state.

According to the embodiment, an area where speed fluctuations occur by a specified number of times or more can be made unavailable, so that the number of unreadable failures due to an unknown cause can be reduced. Namely, the number of unreadable failures due to an unknown cause can be reduced. Namely, a data write to a defective area of a storage medium is avoided by applying this embodiment, whereby the number of occurrences of unreadable failures can be reduced.

According to an aspect of the embodiment, the reliability of data recorded on a magnetic tape can be improved.

This embodiment is not limited to the above described one, and various configurations or embodiments can be adopted within a scope that does not depart from the gist of the embodiment.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A magnetic tape control apparatus comprising:
    a control device that executes a process including:
        detecting an occurrence of speed fluctuations of a running magnetic tape for each recorded area from which a synchronization error is detected, when the synchronization error of a bit signal of a track is detected with a time lag between any of tracks of the running magnetic tape partitioned in units of recording areas; and
        setting the recording area as an unavailable area in accordance with a state where the speed fluctuations in the recording area occur.

2. The magnetic tape control apparatus according to claim 1, wherein
    the detecting detects the occurrence of speed fluctuations of the running magnetic tape for each recording area from which the synchronization error is detected, when the synchronization error is detected earlier in a track closer to one of edges of the magnetic tape in a shorter direction than in a track closer to a center of the magnetic tape.

3. The magnetic tape control apparatus according to claim 1, wherein the process further includes counting the number of times that the synchronization error is detected for each recording area from which the synchronization error is detected, the setting sets the recording area as an unavailable area when a counted number of times that the synchronization error is detected is equal to or larger than a threshold value in a write access, and performs the write access to the next storage area.

4. The magnetic tape control apparatus according to claim 3, wherein the recording area is an area that straddles a plurality of tracks arranged in a longer direction of the magnetic tape; and the counting records a total sum of the number of times of speed fluctuations of all tracks within the recording area in a recording device in the units of recording areas.

5. A non-transitory computer-readable recording medium having stored therein a program for causing a computer to execute a control process comprising:

detecting an occurrence of speed fluctuations of a running magnetic tape for each recorded area from which a synchronization error is detected, when the synchronization error of a bit signal of a track is detected with a time lag between any of tracks of the running magnetic tape partitioned in units of recording areas; and setting the recording area as an unavailable area in accordance with a state where the speed fluctuations in the recording area occur.

6. The non-transitory computer-readable recording medium according to claim 5, wherein the detecting detects the occurrence of speed fluctuations of the running magnetic tape for each recording area from which the synchronization error is detected, when the synchronization error is detected earlier in a track closer to one of edges of the magnetic tape in a shorter direction than in a track closer to a center of the magnetic tape.

7. The non-transitory computer-readable recording medium according to claim 5, the control process further comprising counting the number of times that the synchronization error is detected for each recording area from which the synchronization error is detected, wherein the setting sets the recording area as an unavailable area when a counted number of times that the synchronization error is detected is equal to or larger than a threshold value in a write access, and performs the write access to the next storage area.

8. The non-transitory computer-readable recording medium according to claim 7, wherein the recording area is an area that straddles a plurality of tracks arranged in a longer direction of the magnetic tape; and the counting records a total sum of the number of times of speed fluctuations of all tracks within the recording area in a recording device in the units of recording areas.

9. A method for controlling a magnetic tape, the method comprising:

detecting an occurrence of speed fluctuations of a running magnetic tape for each recorded area from which a synchronization error is detected, when the synchronization error of a bit signal of a track is detected with a time lag between any of tracks of the running magnetic tape partitioned in units of recording areas; and setting the recording area as an unavailable area in accordance with a state where the speed fluctuations in the recording area occur.

10. The method according to claim 9, wherein the detecting detects the occurrence of speed fluctuations of the running magnetic tape for each recording area from which the synchronization error is detected, when the synchronization error is detected earlier in a track closer to one of edges of the magnetic tape in a shorter direction than in a track closer to a center of the magnetic tape.

11. The method according to claim 9, the method further comprising counting the number of times that the synchronization error is detected for each recording area from which the synchronization error is detected, wherein the setting sets the recording area as an unavailable area when a counted number of times that the synchronization error is detected is equal to or larger than a threshold value in a write access, and performs the write access to the next storage area.

12. The method according to claim 11, wherein the recording area is an area that straddles a plurality of tracks arranged in a longer direction of the magnetic tape; and the counting records a total sum of the number of times of speed fluctuations of all tracks within the recording area in a recording device in the units of recording areas.

\* \* \* \* \*